United States Patent [19]
Hoffa

[11] Patent Number: 5,653,016

[45] Date of Patent: *Aug. 5, 1997

[54] WIRE AND CABLE DRIVE APPARATUS IN WIRE AND CABLE CUTTING AND STRIPPING SYSTEM

[75] Inventor: Jack L. Hoffa, Brea, Calif.

[73] Assignee: Eubanks Engineering Company, Monrovia, Calif.

[*] Notice: The term of this patent shall not extend beyond the expiration date of Pat. No. 5,146,673.

[21] Appl. No.: 513,473

[22] Filed: Aug. 14, 1995

Related U.S. Application Data

[60] Division of Ser. No. 149,221, Nov. 8, 1993, Pat. No. 5,456,148, which is a continuation-in-part of Ser. No. 22,981, Feb. 25, 1993, Pat. No. 5,375,485, which is a continuation-in-part of Ser. No. 977,217, Nov. 16, 1992, Pat. No. 5,265,502, which is a continuation of Ser. No. 765,986, Sep. 26, 1991, Pat. No. 5,253,555, which is a continuation-in-part of Ser. No. 659,557, Feb. 22, 1991, abandoned, which is a continuation of Ser. No. 83,512, Jun. 30, 1993, Pat. No. 5,297,457, which is a continuation-in-part of Ser. No. 611,057, Nov. 9, 1990, Pat. No. 5,146,673.

[51] Int. Cl.[6] ................................................. H01R 43/00

[52] U.S. Cl. ............................ 29/825; 29/564.4; 81/9.51

[58] Field of Search ............................. 29/825, 861, 857, 29/720; 81/9.51; 226/118, 170

[56] References Cited

U.S. PATENT DOCUMENTS

| | | |
|---|---|---|
| 1,433,320 | 10/1922 | Wersel . |
| 1,477,678 | 12/1923 | Wetmore . |
| 2,523,936 | 9/1950 | Axelsen . |
| 2,645,959 | 7/1953 | Fuchs et al. . |
| 2,671,363 | 3/1954 | Wells . |
| 2,722,145 | 11/1955 | Schulenburg . |
| 2,765,685 | 10/1956 | Stratman et al. . |
| 2,811,063 | 10/1957 | Eubanks . |
| 2,880,635 | 4/1959 | Harris . |
| 2,934,982 | 5/1960 | Eubanks . |
| 3,176,550 | 4/1965 | Marcotte . |
| 3,222,957 | 12/1965 | Kramer et al. . |
| 3,292,462 | 12/1966 | Turecek et al. . |
| 3,309,948 | 3/1967 | Falken . |
| 3,316,781 | 5/1967 | Bignell et al. . |
| 3,368,428 | 2/1968 | Gudmestad . |
| 3,376,627 | 4/1968 | Sitz . |
| 3,479,718 | 11/1969 | Van de Kerkhof et al. . |
| 3,552,449 | 1/1971 | Woodward et al. . |
| 3,570,100 | 3/1971 | Kindell et al. . |
| 3,604,291 | 9/1971 | Weidner . |
| 3,610,500 | 10/1971 | Brown . |
| 3,612,111 | 10/1971 | Meyer . |
| 3,614,905 | 10/1971 | Bieganski . |
| 3,645,156 | 2/1972 | Meyer et al. . |
| 3,653,412 | 4/1972 | Gudmestad . |
| 3,701,301 | 10/1972 | Gudmestad . |

(List continued on next page.)

FOREIGN PATENT DOCUMENTS

| | | |
|---|---|---|
| 423443 | 4/1991 | European Pat. Off. . |
| 2525402 | 10/1983 | France . |
| 2525403 | 10/1983 | France . |
| 2513478 | 3/1985 | France . |
| 0423443 | 7/1990 | Germany . |
| 54-118584 | 9/1979 | Japan . |
| 1216815 | 3/1986 | U.S.S.R. . |

*Primary Examiner*—Carl J. Arbes
*Attorney, Agent, or Firm*—William W. Haefliger

[57] ABSTRACT

An apparatus for processing wire comprising conveyor structure for displacing the wire endwise, the conveyor structure including first upper and lower endless conveyors engageable with opposite sides of the wire; and first upper and lower assemblies for carrying and controllably driving the conveyors; there being frame structure, including guide structure on which the assemblies are supported and guided for movement toward and away from one another; there being timing belts operatively connected with the assemblies to transmit drive to the conveyors via the assemblies, in different positions of the assemblies associated with the relative movement thereof. Wires of different diameters may be advanced by the conveyors while the same axis of wire travel is maintained.

18 Claims, 4 Drawing Sheets

U.S. PATENT DOCUMENTS

| | | |
|---|---|---|
| 3,769,681 | 11/1973 | Eubanks . |
| 3,838,612 | 10/1974 | Inami . |
| 3,857,306 | 12/1974 | Gudmestad . |
| 3,857,313 | 12/1974 | Endo . |
| 3,869,781 | 3/1975 | Eubanks et al. . |
| 3,872,584 | 3/1975 | Chick et al. . |
| 3,881,374 | 5/1975 | Gudmestad . |
| 3,918,330 | 11/1975 | Blaha . |
| 3,921,472 | 11/1975 | Gudmestad et al. . |
| 3,927,590 | 12/1975 | Gudmestad et al. . |
| 3,946,918 | 3/1976 | Babbin et al. . |
| 4,009,738 | 3/1977 | Baba et al. . |
| 4,027,557 | 6/1977 | Stepan . |
| 4,091,695 | 5/1978 | Funcik et al. . |
| 4,099,428 | 7/1978 | Senior et al. . |
| 4,112,791 | 9/1978 | Wiener . |
| 4,156,961 | 6/1979 | Agoh . |
| 4,164,808 | 8/1979 | Gudmestad et al. . |
| 4,165,768 | 8/1979 | Gudmestad . |
| 4,166,315 | 9/1979 | Gudmestad et al. . |
| 4,175,316 | 11/1979 | Gudmestad . |
| 4,194,281 | 3/1980 | Gudmestad . |
| 4,238,981 | 12/1980 | Karl . |
| 4,244,101 | 1/1981 | Talley . |
| 4,261,230 | 4/1981 | Sindelar . |
| 4,266,455 | 5/1981 | Ago . |
| 4,275,619 | 6/1981 | Shimizu . |
| 4,327,609 | 5/1982 | Resch . |
| 4,350,061 | 9/1982 | Isham et al. . |
| 4,364,289 | 12/1982 | Sorensen . |
| 4,370,786 | 2/1983 | Butler . |
| 4,403,383 | 9/1983 | Dewhurst et al. . |
| 4,428,114 | 1/1984 | Teagno . |
| 4,446,615 | 5/1984 | Talley . |
| 4,493,233 | 1/1985 | Dusel et al. . |
| 4,502,586 | 3/1985 | Dusel et al. . |
| 4,521,946 | 6/1985 | Dusel et al. . |
| 4,543,717 | 10/1985 | Luka . |
| 4,581,796 | 4/1986 | Fukuda et al. . |
| 4,584,912 | 4/1986 | Gudmestad et al. . |
| 4,597,179 | 7/1986 | Goforth . |
| 4,601,093 | 7/1986 | Cope . |
| 4,631,822 | 12/1986 | Reinertz . |
| 4,638,558 | 1/1987 | Eaton . |
| 4,699,027 | 10/1987 | Guyette et al. . |
| 4,713,880 | 12/1987 | Dusel et al. . |
| 4,738,019 | 4/1988 | Kawaguchi . |
| 4,745,828 | 5/1988 | Stepan . |
| 4,802,512 | 2/1989 | Kodera . |
| 4,827,592 | 5/1989 | Kodera . |
| 4,833,778 | 5/1989 | Loustau . |
| 4,838,129 | 6/1989 | Cope . |
| 4,869,135 | 9/1989 | Hoffa . |
| 4,932,110 | 6/1990 | Tanaka . |
| 4,942,789 | 7/1990 | Hoffa et al. . |
| 5,016,347 | 5/1991 | Okazaki et al. . |
| 5,067,379 | 11/1991 | Butler et al. . |
| 5,109,598 | 5/1992 | Koch . |
| 5,142,950 | 9/1992 | Takano et al. . |
| 5,146,673 | 9/1992 | Hoffa . |
| 5,188,213 | 2/1993 | Koch . |
| 5,199,328 | 4/1993 | Hoffa . |
| 5,235,735 | 8/1993 | Koch . |
| 5,253,555 | 10/1993 | Hoffa . |
| 5,265,502 | 11/1993 | Hoffa . |
| 5,293,683 | 3/1994 | Hoffa . |
| 5,297,457 | 3/1994 | Hoffa . |
| 5,368,212 | 11/1994 | Koch . |
| 5,456,148 | 10/1995 | Hoffa . |

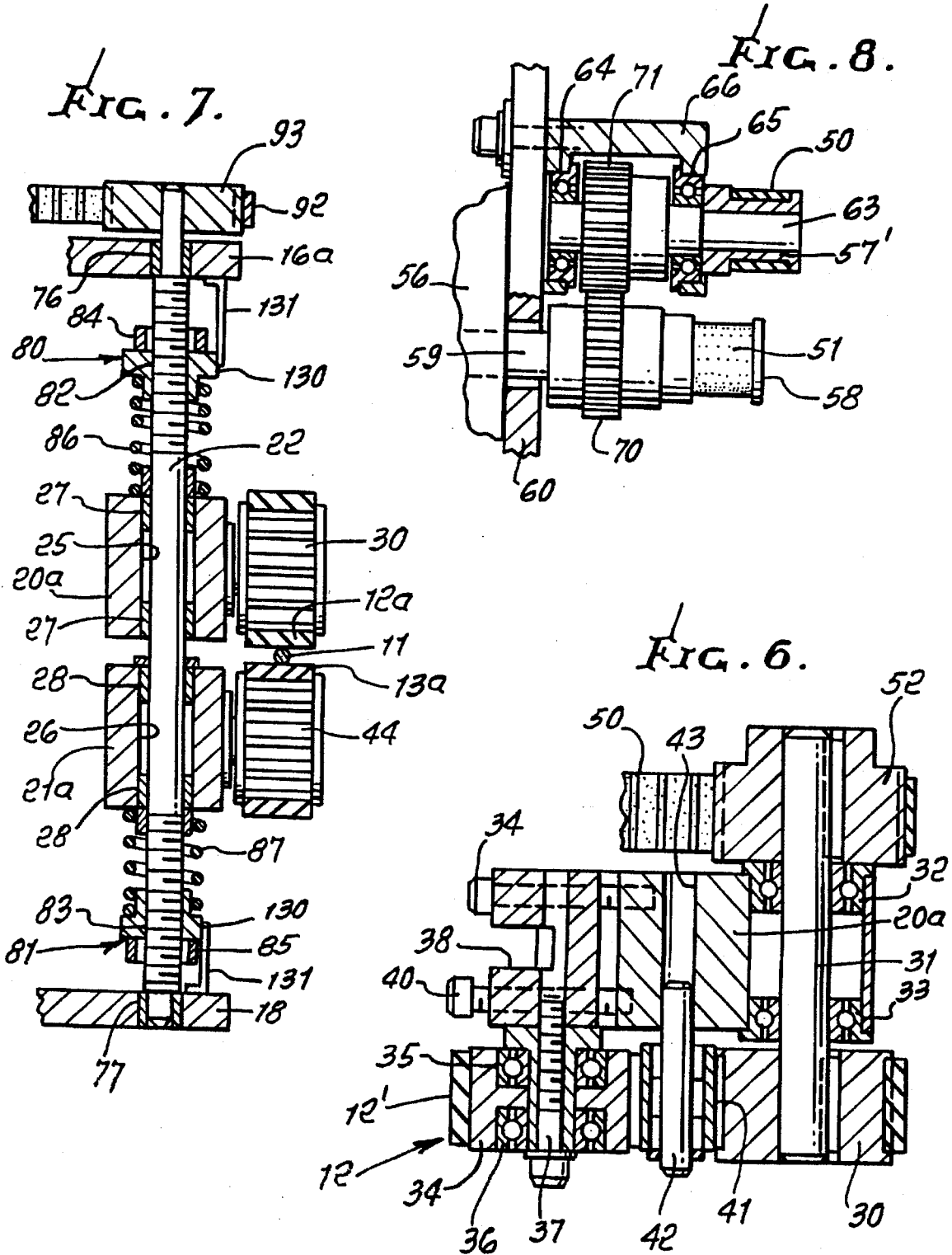

5,653,016

WIRE AND CABLE DRIVE APPARATUS IN WIRE AND CABLE CUTTING AND STRIPPING SYSTEM

BACKGROUND OF THE INVENTION

This is a division, of application Ser. No. 08/149,221 filed Nov. 8, 1993 now U.S. Pat. No. 5,456,148 WHICH IS A CIP OF Ser. No. 08/022,981 Feb. 25, 1993 U.S. Pat. No. 5,375, 485 WHICH IS A CIP OF Ser. No. 07/977,217 Nov. 16, 1992 U.S. Pat. No. 5,265,502 WHICH IS A CON OF Ser. No. 07/765,986 Sep. 26, 1991 U.S. Pat. No. 5,253,555 WHICH IS A CIP OF Ser. No. 07/659,557 Feb. 22, 1991 ABN WHICH IS A CON OF Ser. No. 08/083,512 Jun. 30, 1993 U.S. Pat. No. 5,297,457 WHICH IS A CIP OF Ser. No. 07/611,057 Nov. 9, 1990 U.S. Pat. No. 5,146,673.

This application relates generally to controllable endwise transport of wire or cable, as for example for wire or cable severing, as well as stripping sheathing from severed wire. More particularly, it concerns unusually advantageous apparatus and method effecting such controlled endwise transport of wire or cable.

There is continual need for equipment capable of severing wire or cable into sections, and also capable of rapidly and efficiently stripping sheathing off ends of those sections. It is desirable that these functions be carried out as a wire or cable travels along generally the same axis, i.e., progresses forwardly, and that multiple wire and cable sections of selected length be produced, each having its opposite ends stripped of sheathing, to expose bare metal core wire at each end.

More generally, there is need for very simple, effective, and reliable apparatus to controllably drive wire or cable to and from work stations at which wire or wire end portions are processed, and with minimum power requirements. Provision for means to enable different size wires to have the same endwise travel center line is also needed. The word "wire" herein will be used to designate wire or cable.

SUMMARY OF THE INVENTION

It is a major object of the invention to provide improved apparatus meeting the above need. Basically, the apparatus includes:

a) conveyor means for displacing the wire endwise, the conveyor means including first upper and lower endless conveyors engageable with opposite sides of the wire, b) and first upper and lower assemblies for carrying and controllably driving the conveyors, c) there being frame means including guide means on which the assemblies are supported and guided for movement toward and away from one another, d) there being timing belts operatively connected with the assemblies to transmit rotary drive to the conveyors via the assemblies, in different positions of the assemblies associated with the relative movement thereof.

As will be seen, the two assemblies typically include driven timing pulleys on which the timing belts are entrained. Of advantage is the fact that only a single conveyor drive motor is required, there being driving timing pulleys rotatably carried by the frame and operatively connected with the drive motor to be driven thereby, and the timing belts respectively entrained on the driving timing pulleys. Shaft means and gearing may be operatively coupled between the drive motor and the driving timing pulleys, whereby one driving pulley is rotated clockwise, and the other driving pulley is rotated counterclockwise.

Also the conveyors typically include endless belts having stretches extending in the direction of the wire at opposite sides thereof.

It is another object of the invention to locate the guide means to extend vertically so that the assemblies are vertically movable toward and away from one another, the driven and driving timing pulleys having horizontally parallel extending axes, the axis of each driving timing pulley spaced substantially horizontally from the axis of its associated driven timing pulley, whereby the timing belts accommodate to the relative movement of the assemblies toward and away from one another.

Yet another object is to provide secondary drive means on the frame means and coupled with the assemblies for effecting the relative movement thereof. In this regard, the secondary drive means is coupled with the assemblies via the guide means; the guide means may comprise an elongated element on which the assemblies are slidably mounted; and the elongated element may comprise a shaft rotatably mounted on the frame to be rotated by the secondary drive means, and structure carried on the shaft for controllably yieldably urging the assemblies toward one another.

A further object is the provision of nut structure in threadable engagement with the shaft, and spring means between the nut means and the assemblies to exert yieldable force against the assemblies, in directions toward the wire.

An additional object is to provide the conveyor means to include second upper and lower endless conveyors engageable with opposite sides of the wire, and spaced from the first upper and lower conveyors in the direction of wire travel, and wire cutter means located between the first conveyors and the second conveyors.

Also then includible are:
i) second upper and lower assemblies for carrying and controllably driving the second conveyors,
ii) there being second frame means including second guide means on which the second assemblies are supported and guided for relative movement toward and away from one another,
iii) there being second timing belts operatively connected with the second assemblies to transmit rotary drive to the second conveyors via the second assemblies, in different positions of those assemblies associated with the relative movement thereof.

These and other objects and advantages of the invention, as well as the details of an illustrative embodiment, will be more fully understood from the following specification and drawings, in which:

DRAWING DESCRIPTION

FIG. 6 is a plan view taken in section on lines 6—6 of FIG. 5;

FIG. 7 is a section taken in elevation on lines 7—7 of FIG. 1; and

FIG. 8 is a fragmentary elevation taken on lines 8—8 of FIG. 4.

DETAILED DESCRIPTION

Figure 1:
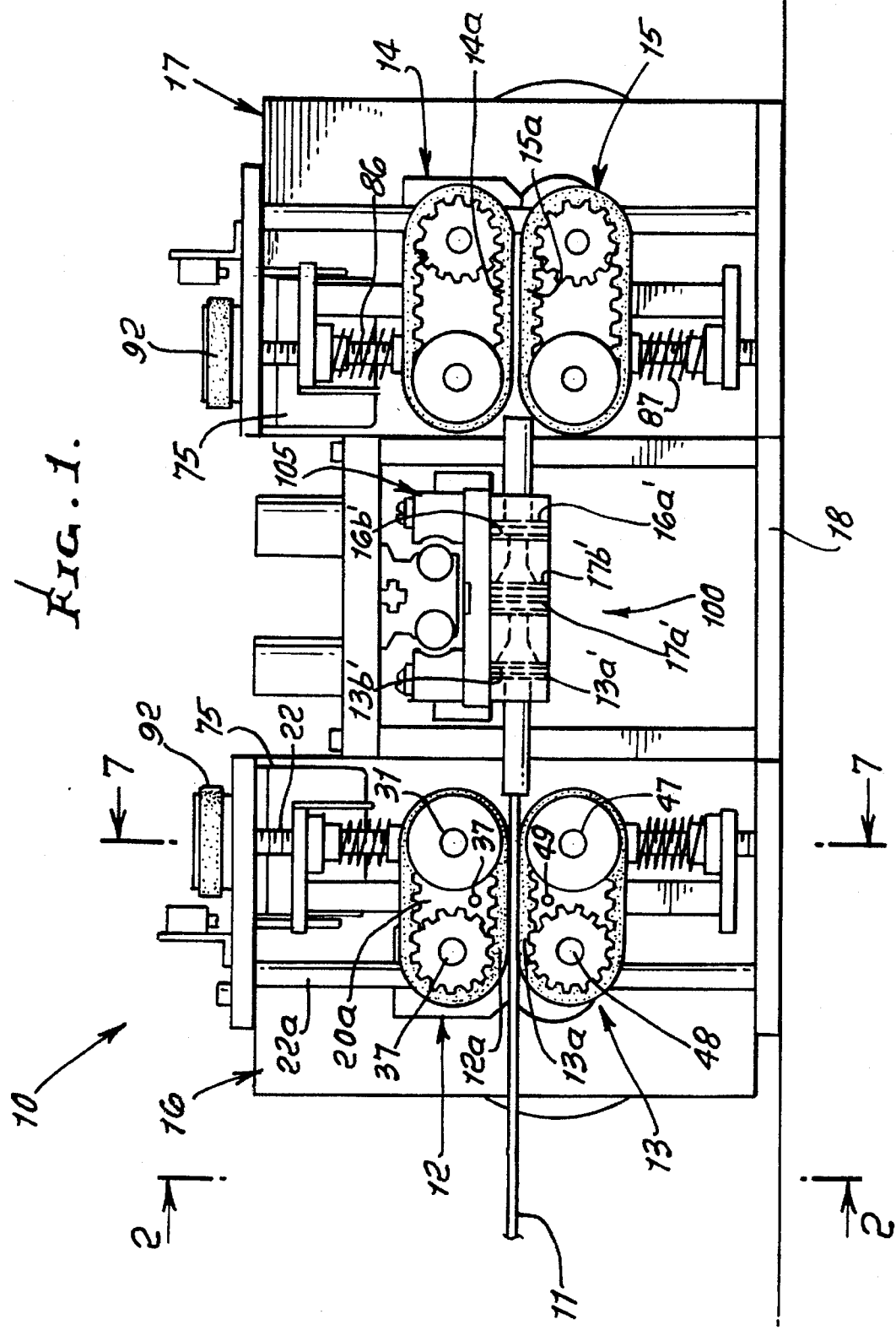
FIG. 1 is a side view elevation showing wire displacing and processing apparatus.

The illustrated apparatus 10 in FIG. 1 is used for processing wire or cable 11 moving from left to right under the control of conveyor means. As shown, the conveyor means includes first upper and lower endless conveyors 12 and 13 engageable with opposite sides (upper and lower) of the wire. The conveyor means may also include second upper and lower endless conveyors 14 and 15 engageable with upper and lower sides of the wire, as the wire, or a cut section thereof, travels rightwardly. The conveyors 12 and 13 operate together so that their belt stretches 12a and 13a engage and displace the wire rightwardly, or leftwardly; and likewise, conveyors 14 and 15 operate together so that their stretches 14a and 15a engage and displace wire or a cut section thereof rightwardly or leftwardly. Frames associated with the conveyors are indicated generally at 16 and 17, and a base for the frames at 18.

Figure 2:
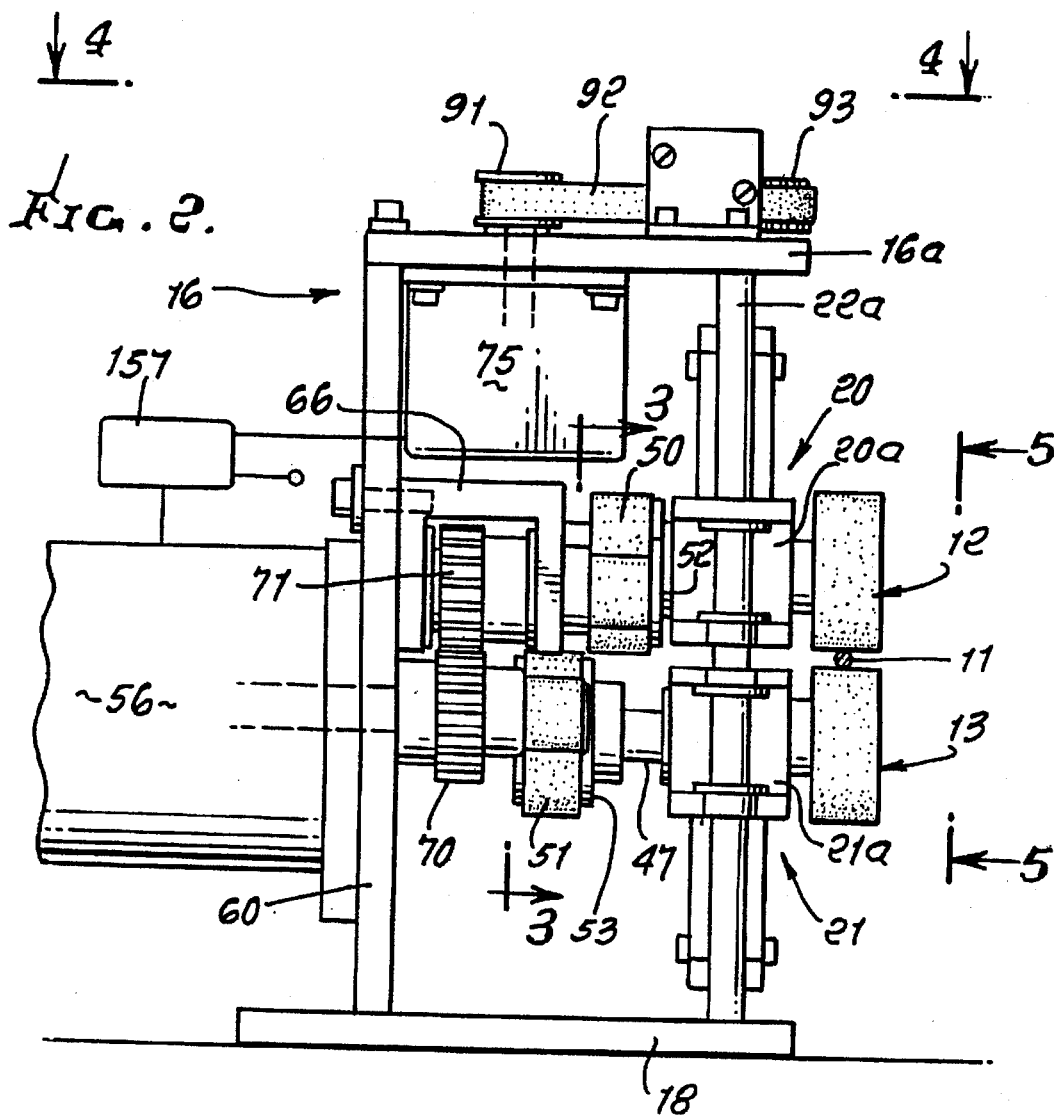
FIG. 2 is an enlarged elevation taken on lines 2—2 of FIG. 1.
Figure 4:
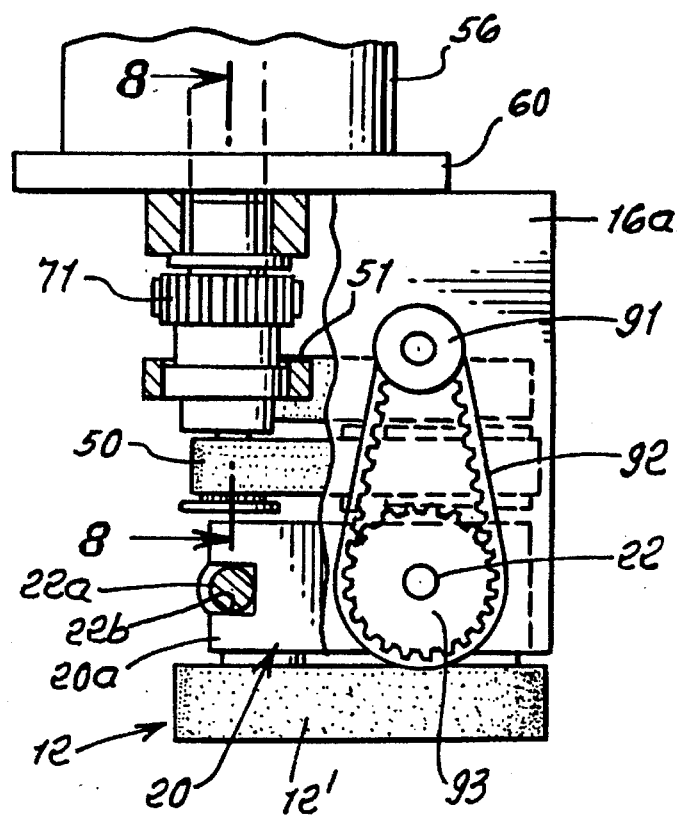
FIG. 4 is a plan view, partly broken away, taken on lines 4—4 of FIG. 2.

Referring now to FIG. 2, first upper and lower assemblies 20 and 21 are provided to respectively carry and controllably drive the first conveyors 12 and 13. The frame 16 includes an upper plate 16a; and a guide means for the assemblies 20 and 21 is provided in the form of a fixed shaft 22a and a rotary vertical shaft 22, both extending between 16a and the base 18. Shafts 22a and 22 are spaced apart as shown. See also FIGS. 4 and 7. Shaft 22a guides in slot 22b in a block 20a. The assemblies 20 and 21 include blocks 20a and 21a containing bores 25 and 26 to pass the shaft, sleeve bearings 27 and 28 being provided to enable guided up and down sliding of the blocks on the shaft.

Conveyor 12 includes a driven sprocket 30 keyed to a drive shaft 31 extending horizontally normal to the direction of wire travel (see FIG. 6). Shaft 31 is mounted by bearings 32 and 33 mounted on block 20a. Conveyor 12 idler sprocket 34 rotates on bearings 35 and 36 supported by a shaft 37 in the form of a screw attached to sub-block 38. The latter is attached by fasteners 39 and 40 to block 20a. An additional toothed idler 41 is carried by a shaft 42 mounted in a bore 43 in block 20a. Block 38 is easily removed to permit change of belt 12'.

Figure 5:
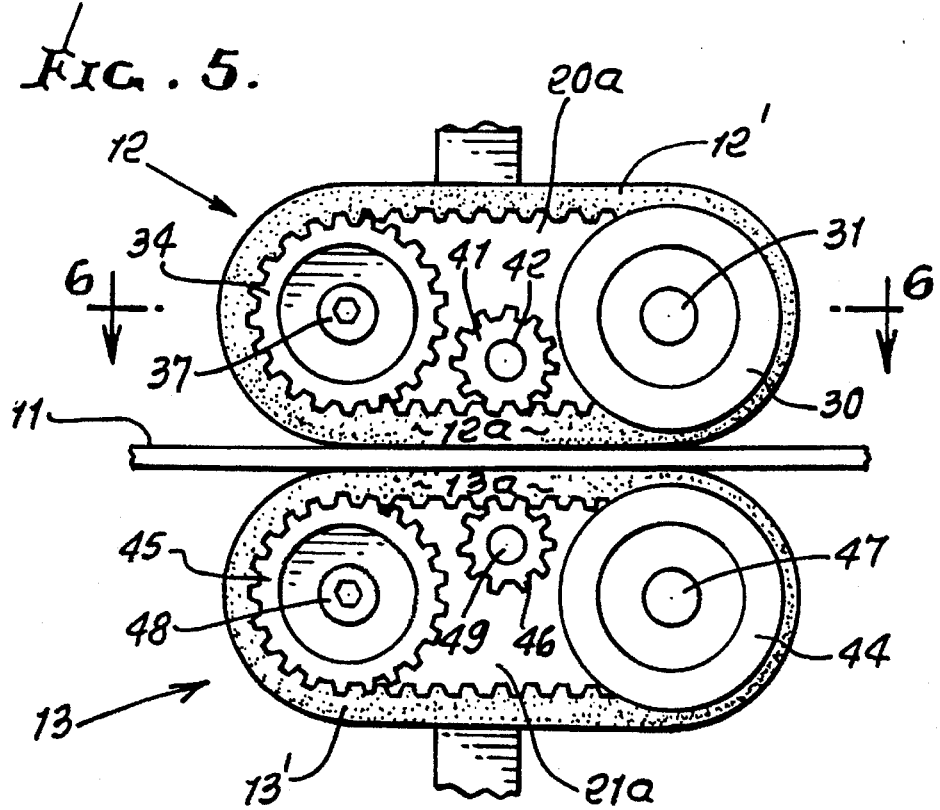
FIG. 5 is an elevation taken on lines 5—5 of FIG. 2.

Conveyor belt 12' is a timing belt entrained on 30, 34 and 41, as shown in FIG. 5. The lower conveyor 13 includes like or corresponding elements, indicated in FIG. 5 by toothed drive sprocket 44, idler sprocket 45, and idler sprocket 46. Lower belt 13' is entrained on 44, 45 and 46, as shown. A drive shaft to sprocket 44 is indicated at 47 in FIGS. 1 and 5; and shafts mounting 45 and 46 are indicated at 48 and 49. See also block 21a in FIG. 5. Thus, the upper and lower assemblies have generally the same construction. Sprockets 41 and 46 are omitted in FIG. 1, but their shafts 37 and 49 are indicated.

In accordance with an important feature of the invention, timing belts are operatively connected with the assemblies to transmit rotary drive to the conveyors via the assemblies, in different positions of the assemblies associated with relative up and down movement thereof.

Figure 3:
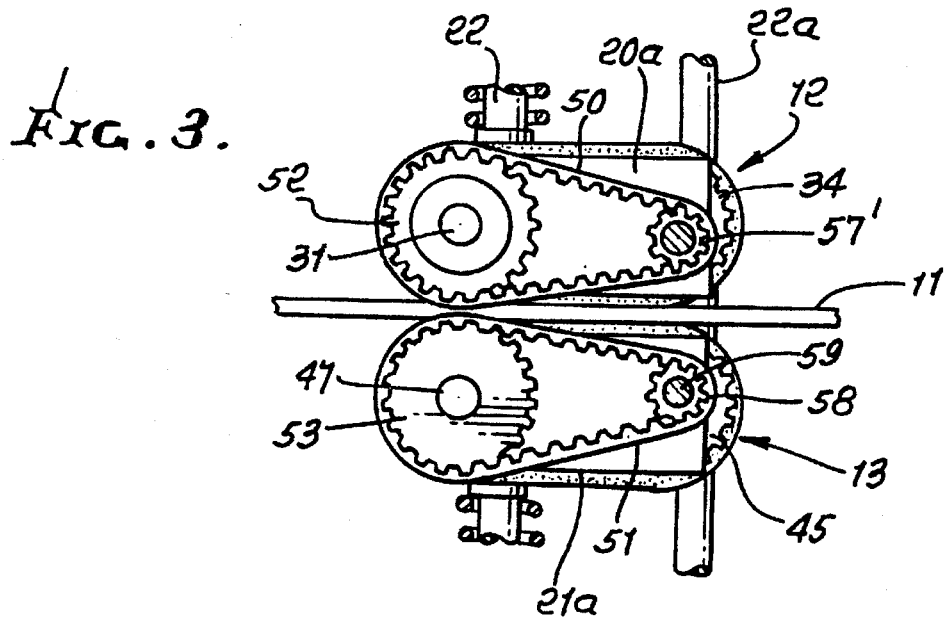
FIG. 3 is a section taken on lines 3—3 of FIG. 2.

Referring to FIG. 3, upper and lower timing belts are shown at 50 and 51, belt 50 entraining an upper assembly driven timing pulley or sprocket 52 on shaft 31; and belt 51 entraining a lower assembly driven timing pulley or sprocket 53 on shaft 47. See also the offset relation (in directions parallel to the shafts) of these belts 50 and 51 in FIG. 2, whereby a highly compact construction is achieved.

A single drive motor 56, electrically controlled by master controller 57, drives both drive belts 50 and 51. See in this regard drive sprockets 57 and 58 for the timing belts 50 and 51. Sprocket 58 is on a shaft 59 extending from the motor 56 (see FIG. 8) mounted to frame plate 60. Thus, drive sprocket 58 does not move up or down with associated lower conveyor 13. Sprocket 57 is on auxiliary shaft 63 parallel to shaft 59 but carried by bearings 64 and 65. The latter are in turn carried by frame structure 66 attached to plate 60. Thus, drive sprocket 57 does not move up and down with associated upper conveyor 12.

In this regard, it will be noted that the guide shaft 22 extends vertically so that the assemblies are vertically movable toward and away from one another, the driven and driving timing pulleys having horizontally parallel extending axes, the axis of each driving timing pulley spaced substantially horizontally from the axis of its associated driven timing pulley, whereby the timing belts accommodate to the relative movement of the assemblies toward and away from one another. A highly compact and integrated combination of elements is thereby achieved. Shaft 63 rotates counter to shaft 59, due to meshing gears 70 on shaft 59, and 71 on shaft 63, whereby the conveyor belts 12' and 13' are driven oppositely (in clockwise and counterclockwise relation respectively) and stretches 12a and 13a in the same direction, simultaneously.

Also provided is secondary drive means on the frame and coupled with the assemblies for effecting the vertical relative movement thereof. In the embodiment shown, the secondary drive means, as for example motor 75, located below plate 16a, is coupled with the assemblies 12 and 13 via the guide means in the form of the elongated and rotatable shaft element 22 on which the assemblies are slidably mounted, as referred to above. The shaft 22 is rotatably mounted to the frame, as via upper and lower bearings 76 and 77, as seen in FIG. 7. Motor coupling to shaft 22 includes driving pulley 91, timing belt 92, and driven pulley 93 mounted on 22 for driving the latter. Structure is carried by the shaft for controllably and yieldably urging the assemblies toward one another. As shown, that structure may advantageously take the form of nut means, as for example nuts 80 and 81, in threadable engagement with the shaft, as at thread locations 82 and 83 on the shaft. The threads are such that when the shaft is rotated in one direction, nut 80 moves downwardly and nut 81 moves upwardly, relative to the shaft. When the shaft is rotated in the opposite direction, the nuts move up to engage plates 84 and 85 to lift the upper conveyor and lower the lower conveyor, opening up the gap between the conveyors.

Spring means, as for example compression springs 86 and 87, between the nuts and the blocks 20a and 21a, exert yieldable and controllable force against the assemblies 12 and 13 in directions yieldably urging them toward one another, and which in turn exert that force on the wire, via the conveyor belts 12' and 13'. The extent of rotation of the shaft 22, as controlled by stepping motor 75, determines the gripping force exerted on the wire, and that force may be varied in accordance with the wire size and surface texture. The master controller 57 controls motor 75. Thus, any size wire or cable can be accurately engaged or driven forwardly or reversely, for processing at the work station, indicated at 100.

The structure driving and controlling the forward or second conveyors 14 and 15 is the same as that described for conveyors 12 and 13, the work station 100 located between those pairs of conveyors 12 and 13, and 14 and 15. Cutter blades and their operation may take the form, as described in U.S. Pat. No. 5,199,328, incorporated herein by reference. See blades indicated at 13a' and 13b', 16a' and 16b', and 17a' and 17b', in FIG. 1, and corresponding to blades 13a, 13b, 16a, 16b, 17a, and 17b, described in that prior patent. Other forms of blades and blade operating mechanism 105 may also be used.

Accordingly, the wire drive is usable in conjunction with cutter blades located for movement toward and away from the endwise axis, and with blade drive means operatively connected with the blades to displace them toward and away from the endwise axis, to sever the cable or the wire, and also to strip insulation therefrom. Drive mechanism for the blade operating mechanism 105 may be controlled by controller 57.

As seen from the above, apparatus embodying the invention embodies:

a) conveyor means for displacing the wire endwise, the conveyor means including first upper and lower endless conveyors engageable with opposite sides of the wire,
  b) and first upper and lower assemblies for carrying and controllably driving the conveyors,
  c) there being frame means including guide means on which the assemblies are supported and guided for relative movement toward and away from one another,
  d) there being timing belts operatively connected with the assemblies to transmit rotary drive to the conveyors via the assemblies, in different positions of the assemblies associated with the relative movement thereof.

The method of operating the apparatus includes the steps:

i) adjusting the relative positions of the first and second assemblies to open up a wire-receiving space between the upper and lower conveyors,
  ii) then closing the conveyors toward one another and feeding a wire between the conveyors so that the conveyors engage opposite sides of the wire,
  iii) then advancing the conveyors by operation of the timing belts,
  iv) then processing the wire being advanced by the conveyors after the wire advances beyond the conveyors.

Referring again to FIG. 7, means is provided to include springs positioned to exert yieldable force on the assemblies, the nut elements 80 and 81 having threaded engagement with the second guide 22 to controllably tension the respective springs, in response to controlled rotation of the second guide. Such means may include shoulders such as flats 130 on each nut and spaced about the shaft axis. Holders 131 engage the flats and are carried by the frame, to hold the nuts against rotation. Each holder may be moved (deflected) away from a flat, to allow selective or adjustable rotation of the nut, whereby the spring tension associated with that nut can be adjusted. Thus, by increasing the tension in the upper spring, the two conveyors can be lowered, and vice versa; and by increasing the tension in the lower spring, the two conveyors can be raised. Thus, the wire center position between the conveyors can be raised or lowered, to accommodate wire feed locations.

In FIG. 7, the drive 93 may comprise a hand wheel instead of (or in addition to) being motor driven, for enhanced control.

The described timing belt driven apparatus eliminates backlash that would otherwise be associated with gears, whereby very accurate control of wire advancement and retraction is achieved. Thus, the drive motor for the conveyors is reversible and may be a step motor.

Accordingly, the invention enables different diameter wires to be handled and to have the same endwise travel center line, as for feeding to wire cutting and stripping blades, and associated apparatus, which is a very desirable feature or result. Very simple, effective, anti-backlash means is provided by the invention, to achieve these objectives.

In addition, the present invention enables wire to be advanced to the cut (cut blade) position, and then repositioned (after cutting) axially along a fixed and predetermined travel centerline. This is very desirable, and required, for accurate and consistent handling or processing of wires of different diameters or sizes. It also enables simple, initial wire introduction into the apparatus by either of two methods or techniques, as follows:

In the first such method (method A), the primary conveyors at the initial feed side of the cutter and stripper blades are opened away from the wire travel axis, and the wire end is placed within the input wire primary guide funnel 280. The conveyors are then closed toward one another to cause belt stretches 12a and 13a to grip the wire. The conveyors are then operated to advance the wire sufficiently to feed the forwardmost extent of the wire past the cutter, through secondary guide funnel 281 and associated tube 281a, and into engagement with belts 14a and 15a of secondary conveyors 14 and 15. The wire is then cut by the cutter blades and the forward cut-off section is driven out of the apparatus by operation of conveyors 14 and 15. The forward tip of the remaining wire, at the cutter blade location, is then at a known position to enable accurate subsequent processing of the remaining wire, under the control of a programmable master control.

In the second such method (method B), the primary conveyors 12 and 13 remain closed, and the forward end of the wire to be processed is held lightly against the entrance at 282 formed by the closed together belt stretches 12a and 13a.

The conveyors 12 and 13 are then operated to advance the wire between stretches 12a and 13a, then past the processing cutters (stripping and severing), then through the funnel 281 and tube 281c, and into engagement with secondary conveyor belts 14a and 15a at the feed entrance formed therebetween. The rest of the method is the same as above in method A.

The above methods A and B are made possible by virtue of maintenance of a fixed axial travel path of the wire, as referred to above, and by virtue of reduction of "backlash" to negligible amount, if any. The latter is made possible by the use of timing belts in the conveyor drives and in the provision of the single drive for both cutting and severing, as referred to in FIGS. 10–13. Prior machines required mechanical adjustment or changes in equipment in order to handle wires of different sizes. For example, in prior machines, wire travel centerlines changed, for wires of different sizes.

In wire processing, the wire end positioned at the cut blade position is advanced by the conveyors by a desired wire length amount. The wire is then cut to form a cut wire section. That section is then controllably moved axially forward and backward to enable sheathing stripping blades to penetrate the sheathing to selected depth near opposite ends of the cut section. Wire movement axially then effects removal of cut sheathing slugs. Very low backlash in wire drives (to the conveyors) is required for highly accurate cut wire section length determination, and for accurate stripping slug length determination, for wires of different sizes, while the wire is kept on a predetermined, fixed, axial, travel path.

Wires of outer diameter between about 0.030 inches up to about 0.25 inches may be advanced along the same axis and processed.

I claim:

1. The method of operating apparatus for processing wire, said apparatus comprising:

a) conveyor means for displacing the wire endwise, said conveyor means including first upper and lower endless conveyors engageable with opposite sides of the wire,
  b) and upper and lower assemblies for carrying and controllably driving said conveyors, c) there being frame means including guide means on which said assemblies are supported and guided for relative movement of at least one assembly toward and away from the other assembly, d) there being timing belts operatively connected with said assemblies to transmit drive to said conveyors, said method including:

i) adjusting the relative position of at least one of the upper and lower assemblies to relatively close said upper and lower conveyors toward one another, ii) feeding a wire between said conveyors while the conveyors are closed toward one another so that the conveyors engage opposite sides of the wire, iii) then advancing the conveyors by operation of said timing belts, to advance the wire, iv) then processing the wire being advanced by the conveyors after the wire advances beyond the conveyors.

2. The method of claim 1 wherein said advancing of the conveyors is effected to maintain wires of different diameters extending along a predetermined axially extending travel path as the wires of different diameters are advanced and processed.

3. The method of claim 1 including providing cutter means for processing the wire, operating the cutter means to cut off a forward end section of the wire, leaving a rearward remainder portion of the wire having a cut forwardmost end thereof at a known position at the cutter means, for subsequent processing.

4. In the method of processing wire, the steps comprising a) displacing wire of a first diameter endwise along a travel path for processing by cutter means, and subsequently displacing wire of a second diameter endwise along the same said travel path for processing by said cutter means, b) providing upper and lower endless conveyors and operating said conveyors to advance said wires and to maintain the same endwise travel path for both wires, without adjusting the relative position of the conveyors by external means to compensate for change in wire diameter, c) said operating of the conveyors including urging said conveyors toward one another to engage opposite sides of the wires for centering the wires in alignment with said travel path, as the wire is advanced by the conveyors.

5. The method of claim 4 including maintaining an axis of said travel path along which both wires travel axially, along their travel paths.

6. The method of claim 4 including providing and operating cutter means to cut off a forward end section of the wire, leaving a rearward remainder portion of the wire having a cut forwardmost end thereof at a known position at the cutter means, for subsequent processing.

7. The method of claim 4 wherein said operating of the conveyors includes providing drive means for the conveyors with timing belts operated in anti-backlash drive transmitting mode.

8. The method of operating apparatus for processing wire, said apparatus comprising:

a) conveyor means for displacing the wire endwise, said conveyor means including first upper and lower endless conveyors engageable with opposite sides of the wire, b) and first upper and lower assemblies for carrying and controllably driving said conveyors, c) there being frame means including guide means on which said assemblies are supported and guided for relative movement toward and away from one another, d) and drive means to transmit drive to said conveyors in different positions of the assemblies associated with said relative movement thereof, said method including i) positioning the assemblies to receive the wire between upper and lower conveyors, closed toward one another, ii) feeding the wire between the conveyors while the conveyors are closed toward one another so that the conveyors engage opposite sides of the wire, for axial advancement, iii) the assemblies positioned so that wires of different diameters, when fed between the conveyors, will have the same axis of advancement, iv) then advancing the conveyors by operation of said drive means, v) then processing the wire advanced by the conveyors.

9. The method of operating apparatus for processing wire, said apparatus comprising:

a) conveyor means for displacing the wire endwise, said conveyor means including first upper and lower endless conveyors engageable with opposite sides of the wire, b) and first upper and lower assemblies for carrying and controllably driving said conveyors, c) there being frame means including guide means on which said assemblies are supported and guided for relative movement toward and away from one another, d) and drive means to transmit drive to said conveyors in different positions of the assemblies associated with said relative movement thereof, said method including i) positioning the assemblies to feed the wire between upper and lower conveyors, closed toward one another, ii) loading the wire between the conveyors by placing the forward end of the wire at the entrance formed by the closed conveyors, so that the closed conveyors engage opposite sides of the forward end of the wire, for axial advancement, iii) the assemblies positioned so that wires of different diameters, when fed between the conveyors, will have the same axis of advancement, iv) then advancing the conveyors by operation of said drive means, v) then processing the wire advanced by the conveyors.

10. The method of claim 9 including providing and operating cutter means to cut off a forward end section of the wire, leaving a rearward remainder portion of the wire having a cut forwardmost end thereof at a known position at the cutter means, for subsequent processing.

11. The method of operating apparatus for processing wire having sheathing, said apparatus comprising a) two conveyor means for advancing the wire axially endwise, each said conveyor means including upper and lower endless conveyors engageable with opposite sides of the wire, the upper and lower conveyors of at least one said conveyor means including endless belts, and b) blade means for severing the wire and for cutting into said sheathing, said blade means being located between said two conveyor means, said method including:

i) operating at least one of said conveyor means to feed a first said wire having said sheathing endwise forwardly into proximity to the blade means, ii) operating the blade means to sever the first wire, thereby to form forward and rearward first wire sections, iii) operating the blade means to cut into sheathing on said wire sections, thereby forming sheathing sections, iv) operating both said conveyor means to displace said wire sections endwise oppositely, thereby to remove said sheathing sections from the wire sections.

12. The method of claim 11 wherein there is a second said wire having said sheathing and having a diameter that is different from the diameter of said first wire, the first wire having been advanced along a predetermined travel path, and including the further steps:

v) operating at least one of the conveyor means to feed the second said wire having said sheathing endwise forwardly along said travel path into proximity to the blade means, vi) operating the blade means to sever the second wire, thereby to form forward and rearward second wire sections, vii) operating the blade means to cut into sheathing on said second wire sections, thereby forming sheathing sections, viii) operating both said conveyor means to displace said second wire sections endwise oppositely, thereby to remove said sheathing sections from the second wire sections.

13. The method of operating apparatus for processing wire having sheathing, said apparatus comprising a) two conveyor means for advancing the wire axially endwise, each said conveyor means including upper and lower endless belts engageable with opposite sides of the wire, b) blade means for severing the wire and for cutting into said sheathing, said blade means being located between said two conveyor means, said method including:

i) operating at least one of the conveyor means, including said belts, to feed a first said wire having said sheathing endwise forwardly into proximity to the blade means, ii) operating the blade means to sever the first wire, thereby to form forward and rearward first wire sections, iii) operating the blade means to cut into sheathing on said wire sections, thereby forming sheathing sections, iv) operating one said conveyor means, including said belts, to displace one said wire section, thereby to remove one said sheathing section from one said wire section, and operating the other said conveyor means, including said belts, to displace the other said wire section, thereby to remove the other said sheathing section from said other wire section.

14. The method of claim 13 wherein there is a second said wire having said sheathing and having a diameter that is different from the diameter of said first wire, the first wire having been advanced along a predetermined travel path, and including the further steps:

v) operating at least one of said conveyor means, including said belts, to feed the second said wire having said sheathing endwise forwardly into proximity to the blade means, vi) operating the blade means to sever the second wire, thereby to form forward and rearward second wire sections, vii) operating the blade means to cut into sheathing on said second wire sections, thereby forming sheathing sections, viii) operating one of said conveyor means, including said belts, to displace one said second wire section, thereby to remove one said sheathing section from said one second wire section, and operating the other said conveyor means, including said belts, to displace the other said second wire section, thereby to remove the other said sheathing section from said other second wire section.

15. The method of operating apparatus for processing wire having sheathing, said apparatus comprising a) conveyor means for advancing the wire axially endwise, said conveyor means having wire-engaging belts, and b) blade means for cutting into said sheathing, said method including:

i) operating the conveyor means including said belts to feed a first said wire having said sheathing endwise forwardly into proximity to the blade means, ii) operating the blade means to cut into sheathing on said first wire, thereby forming a sheathing section, iii) operating the conveyor means, including said belts, to displace said first wire endwise rearwardly thereby to remove said sheathing section from said first wire.

16. The method of claim 15 wherein there is a second said wire having said sheathing and having a diameter that is different from the diameter of said first wire, the first wire having been advanced along a predetermined travel path, and including the further steps:

iv) operating the conveyor means, including said belts, to feed the second said wire endwise forwardly along said travel path into proximity to the blade means, v) operating the blade means to cut into the sheathing on said second wire, thereby forming a sheathing section, vi) operating the conveyor means, including said belts, to displace said second wire endwise rearwardly thereby to remove said sheathing section from said second wire.

17. The method of operating apparatus for processing wire having sheathing, said apparatus comprising a) a conveyor for advancing the wire axially endwise, said conveyor having wire-engaging belting, and b) blade means for severing the wire and for cutting into said sheathing, said method including:

i) operating the conveyor, including said belting, to feed a first said wire endwise forwardly into proximity to the blade means, ii) operating the blade means to sever the first wire, thereby to form forward and rearward first wire sections, iii) operating the blade means to cut into sheathing on one wire section, thereby forming a sheathing section on said one wire section, iv) and operating the conveyor to displace said one wire section endwise, thereby to remove said sheathing section from said one wire section.

18. The method of claim 17 wherein there is a second said wire having said sheathing and having a diameter that is different from the diameter of said first wire, the first wire having been advanced along a predetermined travel path, and including the further steps:

v) operating the conveyor, including said belting, to feed the second said wire endwise forwardly along said travel path into proximity to the blade means, vi) operating the blade means to sever the second wire, thereby to form forward and rearward second wire sections, vii) operating the blade means to cut into sheathing on one wire section of the second wire thereby forming a sheathing section on said one wire section, viii) and operating the conveyor, including said belting, to displace said one wire section of the second wire endwise, thereby to remove said sheathing section from said one wire section, ix) said operating of the conveyor with respect to said first and second wires being effected without adjusting the conveyor by external means to compensate for different wire diameters.

* * * * *

UNITED STATES PATENT AND TRADEMARK OFFICE
CERTIFICATE OF CORRECTION

PATENT NO. : 5,653,016 Page 1 of 1
DATED : August 5, 1997
INVENTOR(S) : Jack L. Hoffa It is certified that error appears in the above-identified patent and that said Letters Patent is hereby corrected as shown below:

Title page,
Item [60], Related U.S. Application Data, should read:
-- Division of Ser. No. 149,221, Nov. 8, 1993, Pat. No. 5,456,148, which is a continuation-in-part of Ser. No. 22,981, Feb. 25, 1993, Pat. No. 5,375,485, which is a continuation-in-part of Ser. No. 857,972, Mar. 26, 1992, Pat. No. 5,293,683, which is a division of Ser. No. 765,986, Sep. 26, 1991, Pat. No. 5,253,555, which is a continuation-in-part of Ser. No.659,557, Feb. 22, 1991, abandoned, which is a continuation-in-part of Ser. No. 611,057, Nov. 9, 1990, Pat. No. 5,146,673. --

Column 1,
Lines 7-16, delete "This is a division of application Ser.No.08/149,221 filed Nov. 8, 1993 now U.S. Pat. No. 5,456,148 WHICH IS A CIP OF Ser. No. 08/022,981 Feb, 25, 1993 U.S. Pat. No. 5,375,485 WHICH IS A CIP OF Ser. No. 08/977,217 Nov. 16, 1992 U.S. Pat. No. 5,265,502 WHICH IS A CON OF Ser. No. 07/765,986 Sep. 26, 1991 U.S. Pat. No. 5,253,555 WHICH IS A CIP OF Ser. No.07/659,557 Feb. 22, 1991 ABN WHICH IS A CON OF Ser. No.08/083,512 Jun 30, 1993 U.S. Pat. No. 5,297,457 WHICH IS A CIP OF Ser. No. 07/611,057 Nov. 9, 1990 U.S. Pat. No. 5,146,673." should read -- Division of Ser.No. 149,221, Nov. 8, 1993, Pat. No. 5,456,148, which is a continuation-in-part of Ser. No. 22,981, Feb. 25, 1993, Pat. No. 5,375,485, which is a continuation-in-part of Ser. No. 857,972, Mar. 26, 1992, Pat. No. 5,293,683, which is a division of Ser. No.659,557, Feb. 22,1991, abandoned, which is a continuation-in-part of Ser. No. 611,057, Nov. 9, 1990, Pat. No.5,146,673. --

Signed and Sealed this

Twenty-fourth Day of August, 2004

JON W. DUDAS
*Director of the United States Patent and Trademark Office*

UNITED STATES PATENT AND TRADEMARK OFFICE
CERTIFICATE OF CORRECTION

PATENT NO. : 5,653,016  
DATED : August 5, 1997  
INVENTOR(S) : Jack L. Hoffa

Page 1 of 1

It is certified that error appears in the above-identified patent and that said Letters Patent is hereby corrected as shown below:

Column 1,
Lines 7-16, delete,

"This is a division of application Ser.No.08/149,221 filed Nov.8, 1993 now U.S. Pat.No.5,456,148 WHICH IS A CIP OF Ser.No.08/022,981 Feb.25, 1993 U.S.Pat.No.5,375,485 WHICH IS A CIP OF Ser.No.08/977,217 Nov.16, 1992 U.S. Pat.No.5,265,502 WHICH IS A CON OF Ser. No.07/765,986 Sep. 26,1991 U.S. Pat.No.5,253,555 WHICH IS A CIP OF Ser.No.07/659,557 Feb.22, 1991 ABN WHICH IS A CON OF Ser.No.08/083,512 Jun 30, 1993 U.S. Pat.No.5,297,457 WHICH IS A CIP OF Ser.No.07/611,057 Nov.9, 1990 U.S.Pat.No.5,146,673."

should read

--Division of Ser.No.149,221, Nov.8, 1993, Pat.No.5,456,148, which is a continuation-in-part of Ser.No.22,981, Feb.25,1993, Pat.No.5,375,485, which is a continuation-in-part of Ser.No.857,972, Mar.26, 1992, Pat.No.5,293,683, which is a division of Ser.No.765,986, Sept.26, 1991, Pat. No.5,253,555, which is a continuation-in-part of Ser.No.659,557, Feb.22, 1991, abandoned, which is a continuation-in-part of Ser.No.611,057, Nov.9, 1990, Pat.No.5,146,673.--

Signed and Sealed this

Eighteenth Day of January, 2005

JON W. DUDAS  
*Director of the United States Patent and Trademark Office*